US012358748B2

(12) United States Patent
Yamada

(10) Patent No.: US 12,358,748 B2
(45) Date of Patent: Jul. 15, 2025

(54) MEDIUM TRANSPORT APPARATUS

(71) Applicant: SEIKO EPSON CORPORATION, Tokyo (JP)

(72) Inventor: Morihiko Yamada, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 430 days.

(21) Appl. No.: 17/649,001

(22) Filed: Jan. 26, 2022

(65) Prior Publication Data

US 2022/0234857 A1 Jul. 28, 2022

(30) Foreign Application Priority Data

Jan. 28, 2021 (JP) ................................ 2021-011756

(51) Int. Cl.

*B65H 29/60* (2006.01)
*B41J 29/13* (2006.01)
*B65H 5/06* (2006.01)

(52) U.S. Cl.

CPC .............. *B65H 29/60* (2013.01); *B41J 29/13* (2013.01); *B65H 5/062* (2013.01); *B65H 2402/441* (2013.01); *B65H 2402/45* (2013.01); *B65H 2404/1421* (2013.01); *B65H 2601/11* (2013.01)

(58) Field of Classification Search

CPC .. B65H 29/60; B65H 5/062; B65H 2402/441; B65H 2402/45; B65H 2404/1421; B65H 2601/11; B41J 29/13

See application file for complete search history.

(56) References Cited

U.S. PATENT DOCUMENTS

| | | | | | |
|---|---|---|---|---|---|
| 6,829,453 | B2 * | 12/2004 | Kouzu | G03G 21/1638 399/124 |
| 6,973,279 | B2 | 12/2005 | Yokoi | |
| 7,203,448 | B2 | 4/2007 | Yokoi | |
| 7,596,341 | B2 | 9/2009 | Yokoi | |
| 7,684,731 | B2 * | 3/2010 | Hirose | G03G 21/1633 399/124 |

(Continued)

FOREIGN PATENT DOCUMENTS

| | | | |
|---|---|---|---|
| JP | 6-72606 | * | 3/1994 |
| JP | 9-67035 | * | 3/1997 |

(Continued)

*Primary Examiner* — Thomas A Morrison
(74) *Attorney, Agent, or Firm* — WORKMAN NYDEGGER

(57) ABSTRACT

A printer includes an apparatus main body, an inner door unit, a main body gear, a transmission gear, and a lock mechanism section. The lock mechanism section locks the inner door unit against the apparatus main body and unlocks the inner door unit from the apparatus main body. The lock mechanism section includes a counter-engagement shaft which is long in a Y-direction, a lock lever having an engagement surface configured to engage with the counter-engagement shaft, and a tension spring that applies force to the lock lever to enable the engagement surface to change in position from a first posture to a second posture. In a closing operation, the engagement surface changes position to the second posture while shifting the position of contact with the counter-engagement shaft, and applies, to the counter-engagement shaft, a pull-in force for moving the inner door unit to a closed position.

20 Claims, 12 Drawing Sheets

(56) References Cited

U.S. PATENT DOCUMENTS

| | | | | |
|---|---|---|---|---|
| 8,095,039 | B2 * | 1/2012 | Yamauchi | G03G 21/1647 399/121 |
| 8,849,158 | B2 * | 9/2014 | Kamano | G03G 21/1638 399/121 |
| 2005/0036804 | A1 * | 2/2005 | Yokoi | G03G 21/1638 399/124 |
| 2006/0039718 | A1 | 2/2006 | Yokoi | |
| 2007/0154238 | A1 | 7/2007 | Yokoi | |
| 2010/0329738 | A1 * | 12/2010 | Shirai | G03G 21/1633 399/124 |
| 2011/0052253 | A1 * | 3/2011 | Nieda | G03G 21/1633 49/394 |
| 2011/0110699 | A1 * | 5/2011 | Tang | B41J 29/02 400/663 |
| 2012/0141158 | A1 * | 6/2012 | Yamauchi | G03G 21/1633 399/110 |
| 2018/0017932 | A1 * | 1/2018 | Manabe | G03G 21/1647 |

FOREIGN PATENT DOCUMENTS

| | | | | |
|---|---|---|---|---|
| JP | 10-4867 | | * | 1/1998 |
| JP | 2004-287017 | | | 10/2004 |
| JP | 2012-62198 | | * | 3/2012 |
| JP | 2016-133708 | A | | 7/2016 |
| JP | 2017-053930 | A | | 3/2017 |

* cited by examiner

MEDIUM TRANSPORT APPARATUS

The present application is based on, and claims priority from JP Application Serial Number 2021-011756, filed Jan. 28, 2021, the disclosure of which is hereby incorporated by reference herein in its entirety.

BACKGROUND

1. Technical Field

The present disclosure relates to a medium transport apparatus.

2. Related Art

In a sheet transport apparatus in JP-A-2017-53930, an opening/closing door locks against an apparatus main body when a hook member horizontally provided at the opening/closing door engages with a hook shaft provided at the apparatus main body. A contact surface of the hook member to come into contact with the hook shaft extends vertically.

In the sheet transport apparatus in JP-A-2017-53930, to bring such a vertically-extending contact surface into contact with the hook shaft, the hook member needs an excess overstroke from the point the hook member goes beyond the hook shaft to the point the hook member comes into contact with the hook shaft.

In a configuration in which an apparatus main body is closed by a closing operation of a door, when there are members that are brought into engagement by the closing operation of the door other than a lock mechanism section, the overstroke closing operation performed to lock the door may cause those members in engagement to interfere with each other.

SUMMARY

To solve the above-described problem, a medium transport apparatus according to the present disclosure includes: an apparatus main body in which a medium is transported; a door coupled to the apparatus main body and configured to rotate about a rotation axis and switch between an open state and a closed state; a plurality of rotating bodies configured to be away from each other in the open state and to be in contact with each other and transmit a drive force in the closed state; and a lock mechanism section that locks the door against the apparatus main body to bring the door into the closed state and unlocks the door from the apparatus main body to bring the door into the open state. The lock mechanism section includes a counter-engagement portion extending in a first direction, an engagement portion having an engagement surface configured to change in position between a first posture and a second posture in a second direction intersecting with the first direction and engage with the counter-engagement portion, and an application member that applies a force to the engagement portion to enable the engagement surface to change in position from the first posture to the second posture. In a closing operation of the door, the engagement surface changes in position from the first posture to the second posture while shifting a position of contact with the counter-engagement portion, and in the closing operation and in the closed state, the engagement surface applies, to the counter-engagement portion, a pull-in force for moving the door to a closed position.

DESCRIPTION OF EXEMPLARY EMBODIMENTS

Figure 1:
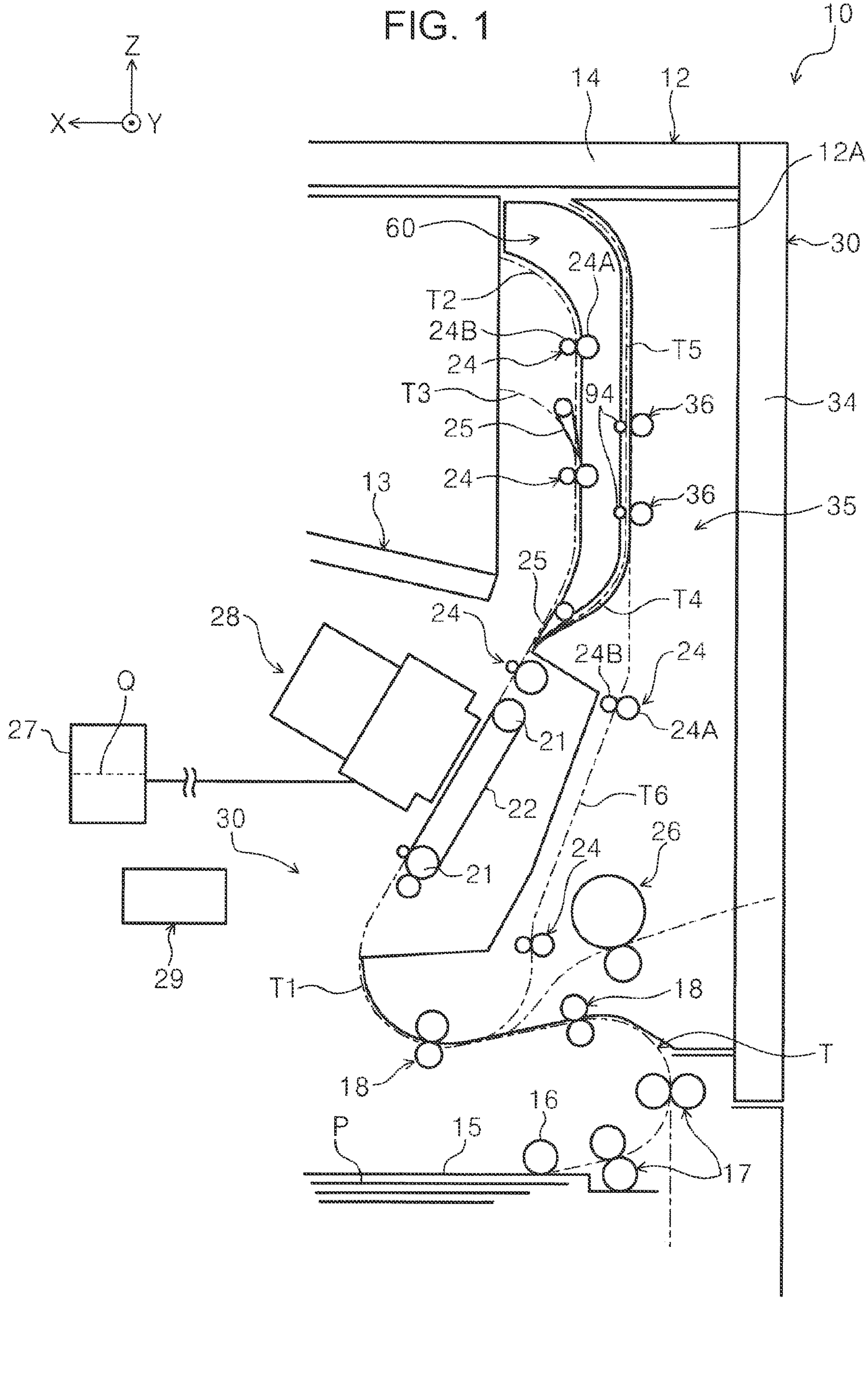
FIG. 1 is a schematic diagram showing an internal configuration of a printer according to an embodiment.

An overview of the present disclosure is described below.

A medium transport apparatus of a first aspect includes: an apparatus main body in which a medium is transported; a door coupled to the apparatus main body and configured to rotate about a rotation axis and switch between an open state and a closed state; a plurality of rotating bodies configured to be away from each other in the open state and to be in contact with each other and transmit a drive force in the closed state; and a lock mechanism section that locks the door against the apparatus main body to bring the door into the closed state and unlocks the door from the apparatus main body to bring the door into the open state. The lock mechanism section includes a counter-engagement portion extending in a first direction, an engagement portion having an engagement surface configured to change in position between a first posture and a second posture in a second direction intersecting with the first direction and engage with the counter-engagement portion, and an application member that applies a force to the engagement portion to enable the engagement surface to change in position from the first posture to the second posture. In a closing operation of the door, the engagement surface changes in position from the first posture to the second posture while shifting a position of contact with the counter-engagement portion, and in the closing operation and in the closed state, the engagement surface applies, to the counter-engagement portion, a pull-in force for moving the door to a closed position.

According to this aspect, when the door is operated from the open position into the closed position, the engagement surface comes into contact with the counter-engagement portion. As the door approaches the closed position, the engagement surface changes its posture from the first posture to the second posture. The engagement surface changes its posture from the first posture to the second posture while shifting the position of contact with the counter-engagement surface. In other words, the engagement surface changes its posture with the engagement surface and the counter-engagement portion staying in contact with each other. Thus, there is no need for the engagement portion to overstroke.

Also, the elimination of the need for the overstroke of the engagement portion allows reduction in the interference between the plurality of rotating bodies.

In a medium transport apparatus of a second aspect according to the first aspect, the engagement portion has a central axis of rotation relative to the door.

According to this aspect, the central axis of rotation of the engagement portion is immobile. Thus, compared to a configuration in which the whole engagement portion slides, the mechanism for moving the engagement portion can be simplified.

In a medium transport apparatus of a third aspect according to the second aspect, the engagement portion includes an anterior surface that comes into contact with the counter-engagement portion before the engagement surface does when a state of the door switches from the open state to the closed state, and when the anterior surface is in contact with the counter-engagement portion, the engagement portion receives, from the counter-engagement portion, a reactive force in a rotational direction in which the engagement surface is moved from the second posture to the first posture.

According to this aspect, because the anterior surface comes into contact with the counter-engagement portion, the engagement surface and the counter-engagement portion transition into a contacting state after the engagement portion is rotated in a direction in which the engagement surface is moved from the second posture to the first posture. In other words, the engagement portion can easily rotate before the engagement surface and the counter-engagement shaft come into contact with each other, which makes it easy for the engagement surface and the counter-engagement portion to transition into a contacting state.

In a medium transport apparatus of a fourth aspect according to the second or third aspect, in the closed state, the central axis of rotation is orthogonal to the rotation axis.

According to this aspect, when the door is moved from the open state to the closed state, the area of contact between the engagement surface and the counter-engagement portion gradually increases, and also the friction force acting on the engagement surface gradually increases in comparison to the configuration in which the engagement portion slides. Thus, a feel of jerkiness felt when the door is brought into the closed state can be reduced.

In a medium transport apparatus of a fifth aspect according to the second to fourth aspects, in the closed state, the position of contact between the engagement surface and the counter-engagement portion is located lower than the central axis of rotation in an apparatus height direction.

According to this aspect, the center of rotation of the engagement portion is located higher than the position of contact between the engagement surface and the counter-engagement portion in the apparatus height direction. This makes it easier for the engagement surface to move away from the counter-engagement portion at the time of unlocking and thus makes unlocking easier.

In a medium transport apparatus of a sixth aspect according to the second to fifth aspects, the engagement portion is provided at one of the apparatus main body and the door, the counter-engagement portion and a restriction portion that restricts movement of the door are provided at another of the apparatus main body and the door, and in the closed state, the counter-engagement portion is at a position overlapping with the restriction portion in an apparatus height direction.

According to this aspect, the restriction portion restricts the movement of the door in the closed state. Since the engagement portion is at a position overlapping with the restriction portion in the apparatus height direction, the position of contact between the engagement surface and the counter-engagement portion and the position where the restriction portion restricts the door are closely disposed. This helps prevent overstroke operation of the door when the engagement surface and the counter-engagement portion come into contact with each other.

In a medium transport apparatus of a seventh aspect according to the second to sixth aspects, when seen in an axial direction of the central axis of rotation, the engagement surface in the second posture extends to both sides of the position of contact with the counter-engagement portion.

According to this aspect, even if the position of contact between the engagement surface and the counter-engagement portion is displaced, the engagement surface and the counter-engagement portion can be brought into contact with each other because the engagement surface extends to both sides of the position of contact.

In a medium transport apparatus of a eighth aspect according to the seventh aspect, the engagement surface is a slanted surface extending in an intersecting direction intersecting with an apparatus height direction, and an angle formed between the apparatus height direction and the intersecting direction is greater than 0° and smaller than 45°.

According to this aspect, regarding the force acting on the position of contact between the engagement surface and the counter-engagement portion, a component force in a horizontal direction orthogonal to the apparatus height direction is large compared to a configuration in which the angle formed between the apparatus height direction and the intersecting direction exceeds 45°. Thus, it is easier to obtain a pull-in force exerted when the engagement portion comes into contact with the counter-engagement portion.

In a medium transport apparatus of a ninth aspect according to the first to eighth aspects, an outer door is provided to the apparatus main body outward of the door, the outer door is rotatably coupled to the apparatus main body and is thereby configured to switch between an opening state and a closing state, and in the closing state, the outer door presses the door in the closed state against the apparatus main body.

According to this aspect, the outer door presses the door in the closed state against the apparatus main body, thereby restricting the door from moving to the open position. Thus, the door can stay in the closed state.

In a medium transport apparatus of a tenth aspect according to the ninth aspect, one of the door and the outer door is provided with a rotatable roller and an elastically deformable press member that presses the roller toward another of the door and the outer door, and the other of the door and the outer door has a contact portion that comes into contact with the roller.

According to this aspect, the roller is pressed against the contact portion by receiving a pressing force from the press member while in contact with the contact portion. Even if the outer door is operated to overstroke relative to the door, the press member elastically deforms and thereby absorbs the pressing force that the contact portion exerts to the roller. Thus, deformation of the roller can be reduced.

In a medium transport apparatus of a eleventh aspect according to the tenth aspect, a first transport path along which the medium is transported is formed between the apparatus main body and the door, and a second transport path along which the medium is transported by rotation of the roller is formed between the door and the outer door.

According to this aspect, even if the medium is jammed during transport, opening the door or the outer door makes it possible to remove the medium and therefore unlikely for the medium to remain in the first transport path or the second transport path.

A medium transport apparatus of a twelfth aspect according to the eleventh aspect further includes a recording section that performs recording on the medium transported thereto.

According to this aspect, the recording section performs recording on the medium transported thereto. Even if the recorded medium is jammed during transport, opening the door or the outer door makes it possible to remove the recorded medium and therefore unlikely for the recorded medium to remain in the first transport path or the second transport path.

Hereinbelow, a specific description is given of a printer 10 as an example of the medium transport apparatus according to the present disclosure.

Figure 2:
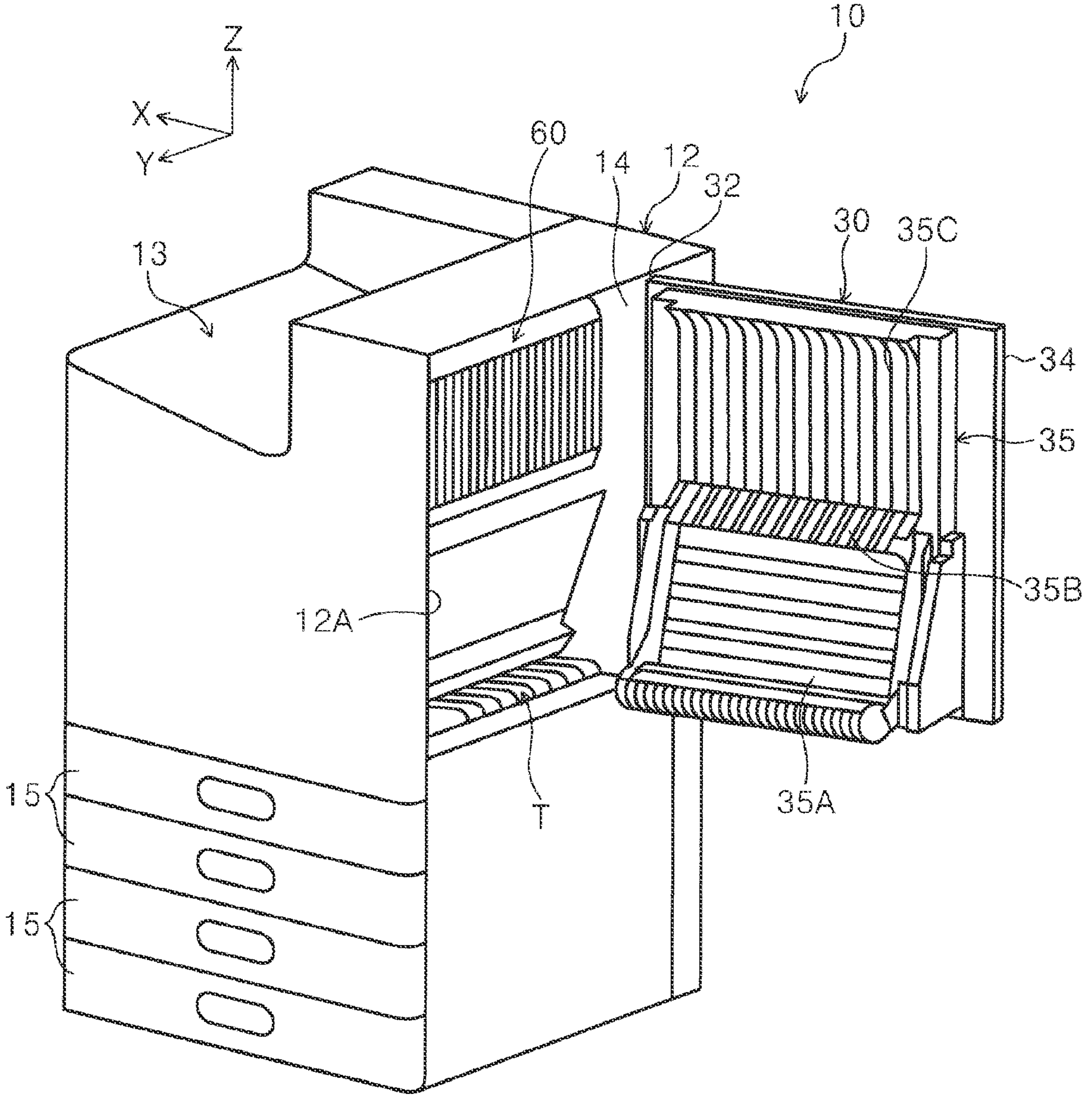
FIG. 2 is a perspective view showing the overall configuration of the printer according to the embodiment.

As shown in FIGS. 1 and 2, the printer 10 is configured as an ink jet recording apparatus that performs recording on a sheet P as an example of the medium by ejecting ink Q as an example of the liquid thereto. Note that the X-Y-Z coordinate system shown in the drawings is a Cartesian coordinate system.

The X-direction is an apparatus width direction as seen from an operator of the printer 10, and is a horizontal direction. A leftward direction of the X-direction is a +X-direction, and a rightward direction of the X-direction is a −X-direction.

The Y-direction is a width direction intersecting with a direction in which the sheet P is transported and is also an apparatus depth direction. The Y-direction is also a horizontal direction. A direction of the Y-direction toward an operator of the printer 10 is a +Y-direction, and a direction of the Y-direction away from the operator is a −Y-direction.

The Z-direction is an example of the apparatus height direction and is a vertical direction. An upward direction of the Z-direction is a +Z-direction, and a downward direction of the Z-direction is a −Z-direction.

In the printer 10, a sheet P is transported travelling along a transport path T shown with a dot-dash line. Note that the direction in which a sheet P is transported is along the transport path T and is therefore different for each section of the transport path T.

Figure 3:
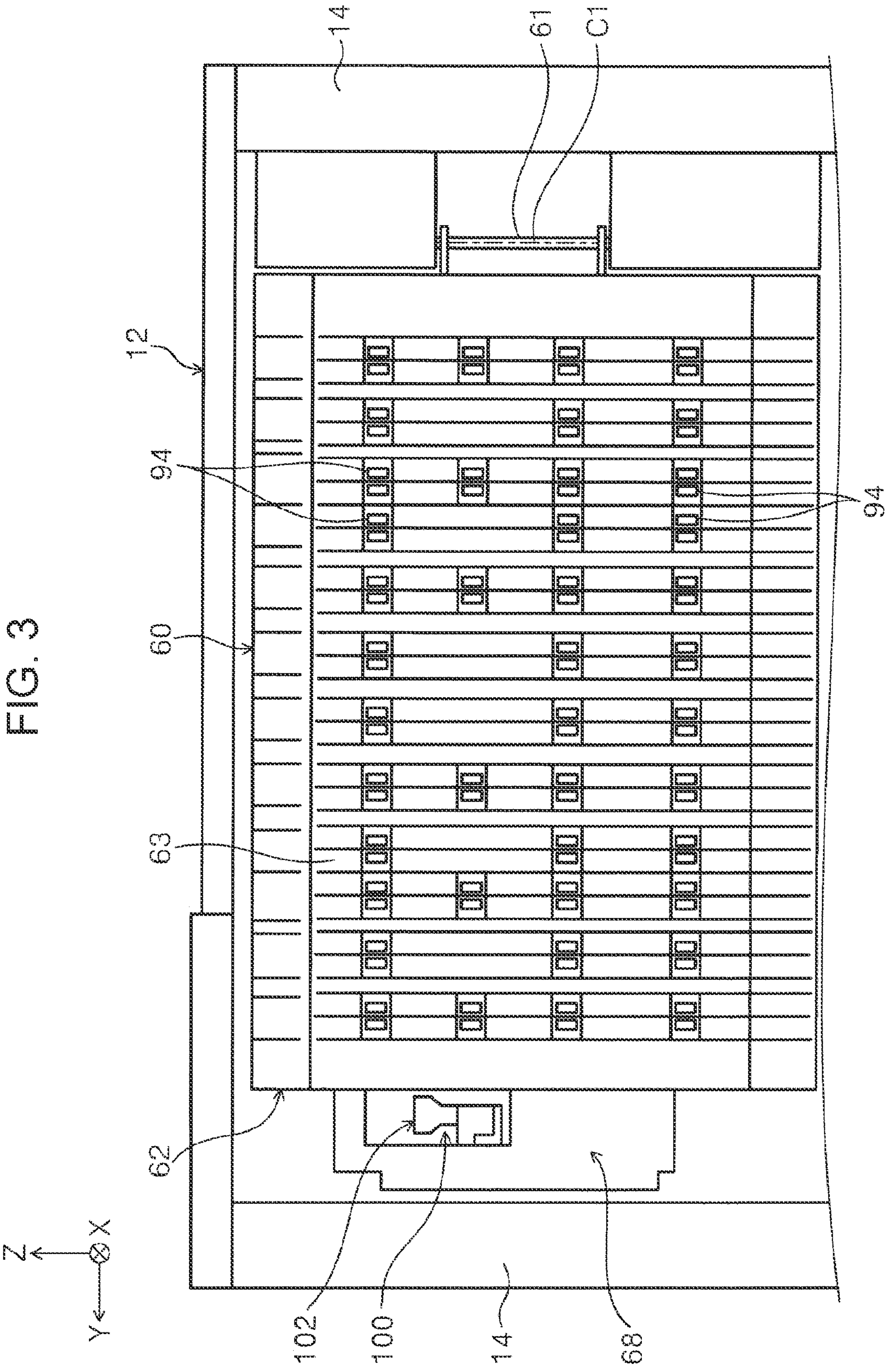
FIG. 3 is a front view showing an inner door unit of the printer according to the embodiment.

The printer 10 includes, by way of example, an apparatus main body 12, an ink tank 27, a line head 28, a controller 29, an outer door unit 30, a rotation section 40 (FIG. 5), an inner door unit 60, and a lock mechanism section 100 (FIG. 3).

The apparatus main body 12 includes a casing forming the contour. A discharge section 13 including a space where a recorded sheet P is discharged is formed on the +Z-direction side of the Z-direction center of the apparatus main body 12. The apparatus main body 12 is also provided with a sheet cassette 15 for housing sheets P. An opening portion 12A opening in the X-direction is formed at a −X-direction end portion of the apparatus main body 12. When the opening portion 12A is open, part of the transport path T is exposed.

The apparatus main body 12 is configured including a main body frame 14 which is a framework member and a main body bracket 45 (FIG. 6) to be described later which is fixed to the main body frame 14. In the apparatus main body 12, a sheet P is transported along the transport path T.

A sheet P housed in the sheet cassette 15 is transported along the transport path T along which a pickup roller 16, transport roller pairs 17, 18, and the like are disposed. Also disposed along the transport path T are two pulleys 21, a transport belt 22 looped around the two pulleys 21, a plurality of transport roller pairs 24 that transport the sheet P, a plurality of flaps 25 that switch the paths to which the sheet P is transported, and the like.

The transport belt 22 faces the line head 28.

The transport roller pairs 24 each have a transport roller 24A disposed on the −X-direction side of the path and a transport roller 24B disposed on the +X-direction side of the path.

The transport path T is, specifically, configured including a main transport path T1, discharge paths T2, T3, a feed-in path T4, a switch-back path T5, and a feed-out path T6.

The main transport path T1 extends from the sheet cassette 15 to the position facing the line head 28.

The discharge path T2 is formed between the apparatus main body 12 and the inner door unit 60 to be described later and extends from the downstream end of the main transport path T1 to the discharge section 13. Also, the discharge path T2 is an example of the first transport path and is a path along which the sheet P is transported.

The discharge path T3 branches off from a midpoint of the discharge path T2 and extends to the discharge section 13.

The feed-in path T4 is a path along which the sheet P is fed from the main transport path T1 into the switch-back path T5 described below.

The switch-back path T5 extends in, by way of example, the +Z-direction. Along the switch-back path T5, the sheet P is transported in the +Z-direction and in the −Z-direction in a switch-back manner.

The feed-out path T6 is a path along which the sheet P is fed out of the switch-back path T5 and which is coupled to the main transport path T1.

The feed-in path T4 and the switch-back path T5 are an example of the second transport path and are formed between the inner door unit 60 and the outer door unit 30 to be described later. Also, along the switch-back path T5, the sheet P is transported by rotation of rubber rollers 36 and pinch rollers 94 to be described later.

The line head 28 is an example of the recording section, and performs recording by ejecting ink Q supplied from the ink tank 27 to the sheet P transported thereto.

The controller 29 is configured including a central processing unit (CPU), a read-only memory (ROM), a random-access memory (RAM), and a storage (none of which is shown), and controls transport of the sheet P and operation of the sections of the printer 10, including the line head 28.

As shown in FIG. 2, the outer door unit 30 is an example of the outer door and is provided to the apparatus main body 12 at its −X-direction side, which is outward of the inner door unit 60 to be described later. The outer door unit 30 is rotatably coupled to the apparatus main body 12 by a hinge section 32.

The hinge section 32 is provided at a −Y-direction end portion of the main body frame 14. The hinge section 32 has a rotation axis (not shown) extending in the Z-direction.

By being rotated about the rotation axis of the hinge section 32, the outer door unit 30 can be switched between an opening state of opening the opening portion 12A and a closing state of closing the opening portion 12A. Further, in the closing state, the outer door unit 30 pushes the inner door unit 60 which is in a closed state in the +X-direction against the apparatus main body 12.

The outer door unit 30 is configured by including, by way of example, an outer cover 34 and an outer frame 35.

The outer cover 34 is formed in a plate shape with a predetermined thickness and is sized to be able to close the opening portion 12A.

The outer frame 35 is attached to the surface of the outer cover 34 that faces the opening portion 12A. The outer frame 35 has a lower portion 35A, a center portion 35B, and an upper portion 35C.

The lower portion 35A forms a portion of the outer frame 35 which is on the −Z-direction side of the Z-direction center of the outer frame 35 and includes therein the feed-out path T6.

The center portion 35B forms a Z-direction center portion of the outer frame 35, and forms the feed-in path T4 together with the inner door unit 60 to be described later.

The upper portion 35C forms a portion of the outer frame 35 which is on the +Z-direction side of the Z-direction center of the outer frame 35, and forms the switch-back path T5 together with the inner door unit 60. At the upper portion 35C, the rubber rollers 36 (FIG. 1) are provided. In other words, the outer door unit 30 has the rubber rollers 36.

Figure 4:
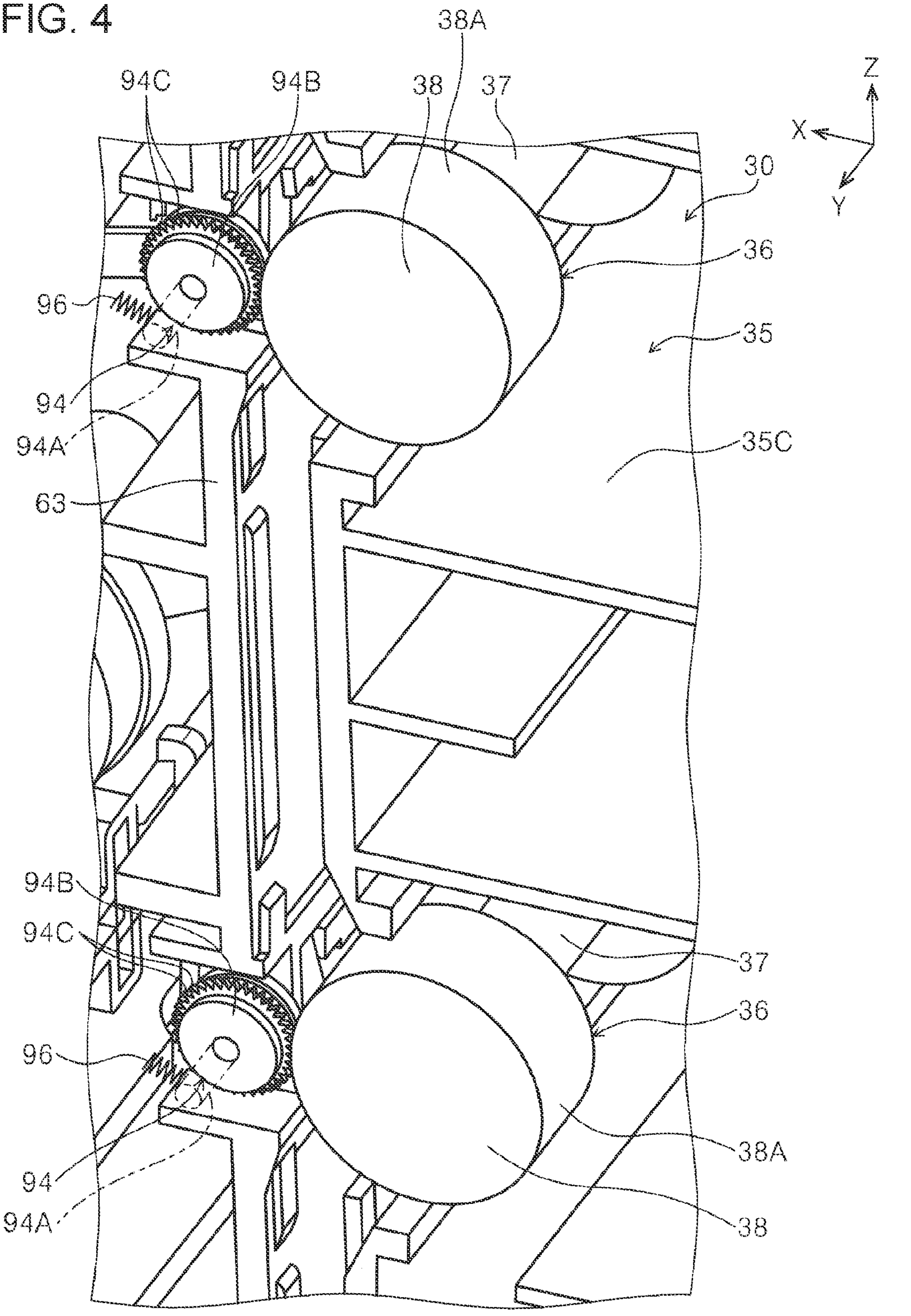
FIG. 4 is a perspective view showing how pinch rollers and rubber rollers are in contact with each other in the printer according to the embodiment.

As shown in FIG. 4, the rubber rollers 36 are an example of the contact portion and are provided at the upper portion 35C of the outer frame 35. The rubber rollers 36 each have a columnar shaft portion 37 extending in the Y-direction and wider diameter portions 38 provided at the shaft portion 37 with a space therebetween in the Y-direction and increased in diameter in the radial direction of the shaft portion 37. The wider diameter portions 38 are made of a rubber member formed in a tubular shape. An outer circumferential surface 38A of the wider diameter portion 38 protrudes from the outer frame 35 in the +X-direction.

In the closing state in which the outer door unit 30 closes the opening portion 12A (FIG. 1), part of the outer circumferential surface 38A is in contact with the pinch roller 94 to be described later.

Figure 5:
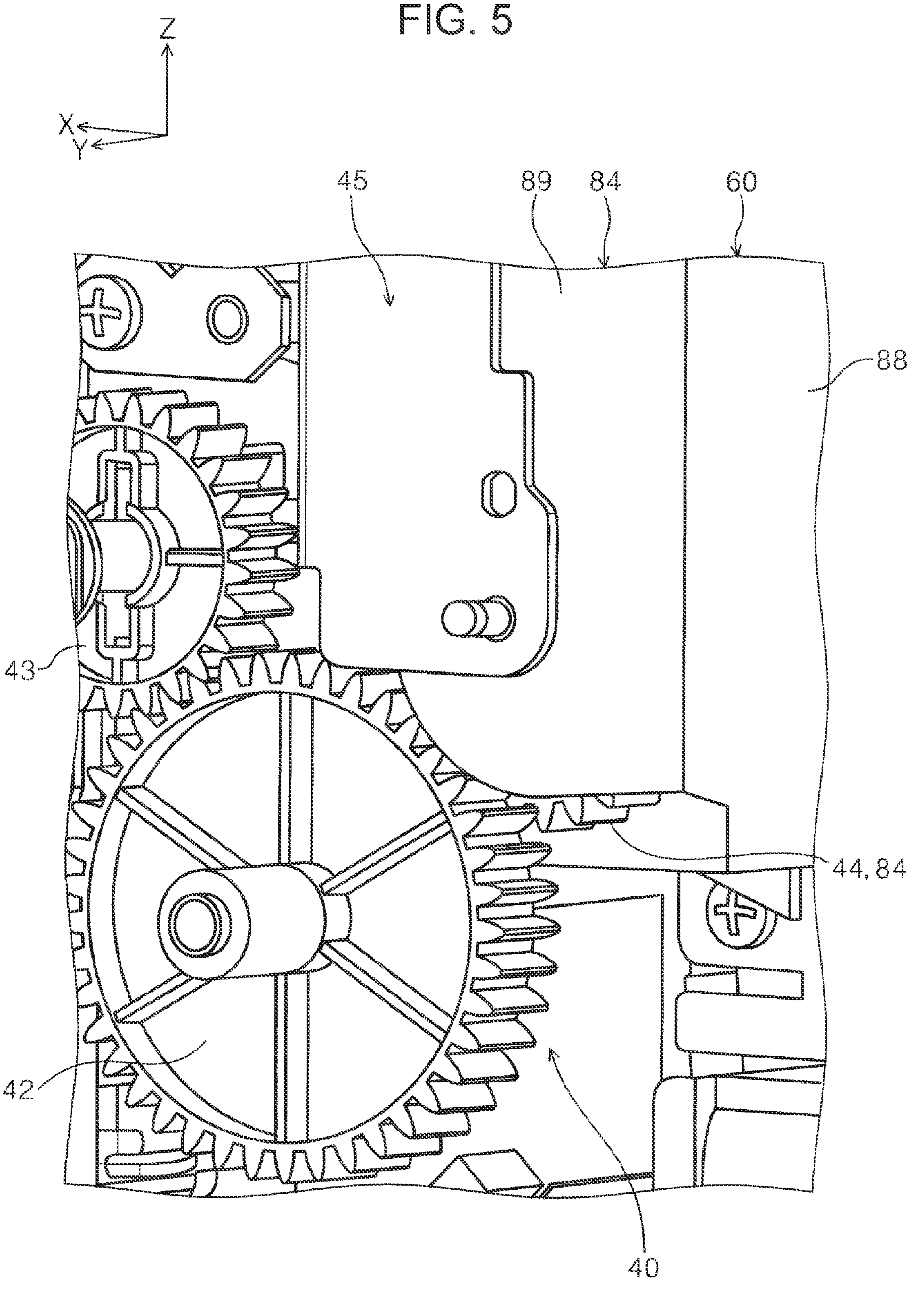
FIG. 5 is a perspective view showing how a main body gear and a gear of a gear section mesh with each other in the printer according to the embodiment.

As shown in FIG. 5, the rotation section 40 has, by way of example, a main body gear 42 and a transmission gear 44.

The main body gear 42 and the transmission gear 44 are an example of the plurality of rotating bodies. The main body gear 42 and the transmission gear 44 are away from each other when the inner door unit 60 to be described later is in an open state, and come into contact with each other and become able to transmit a drive force when the inner door unit 60 is in the closed state.

The main body gear 42 is supported by a bracket (not shown) provided at the apparatus main body 12 (FIG. 2) in a manner rotatable about its axis extending in the Y-direction. A drive force is transmitted to the main body gear 42 from a motor (not shown) via a gear 43.

The transmission gear 44 is provided at a gear section 84 to be described later in a manner rotatable about its axis extending in the Y-direction. When the inner door unit 60 is in the closed state, the transmission gear 44 meshes with the main body gear 42 and become able to transmit a drive force.

Figure 6:
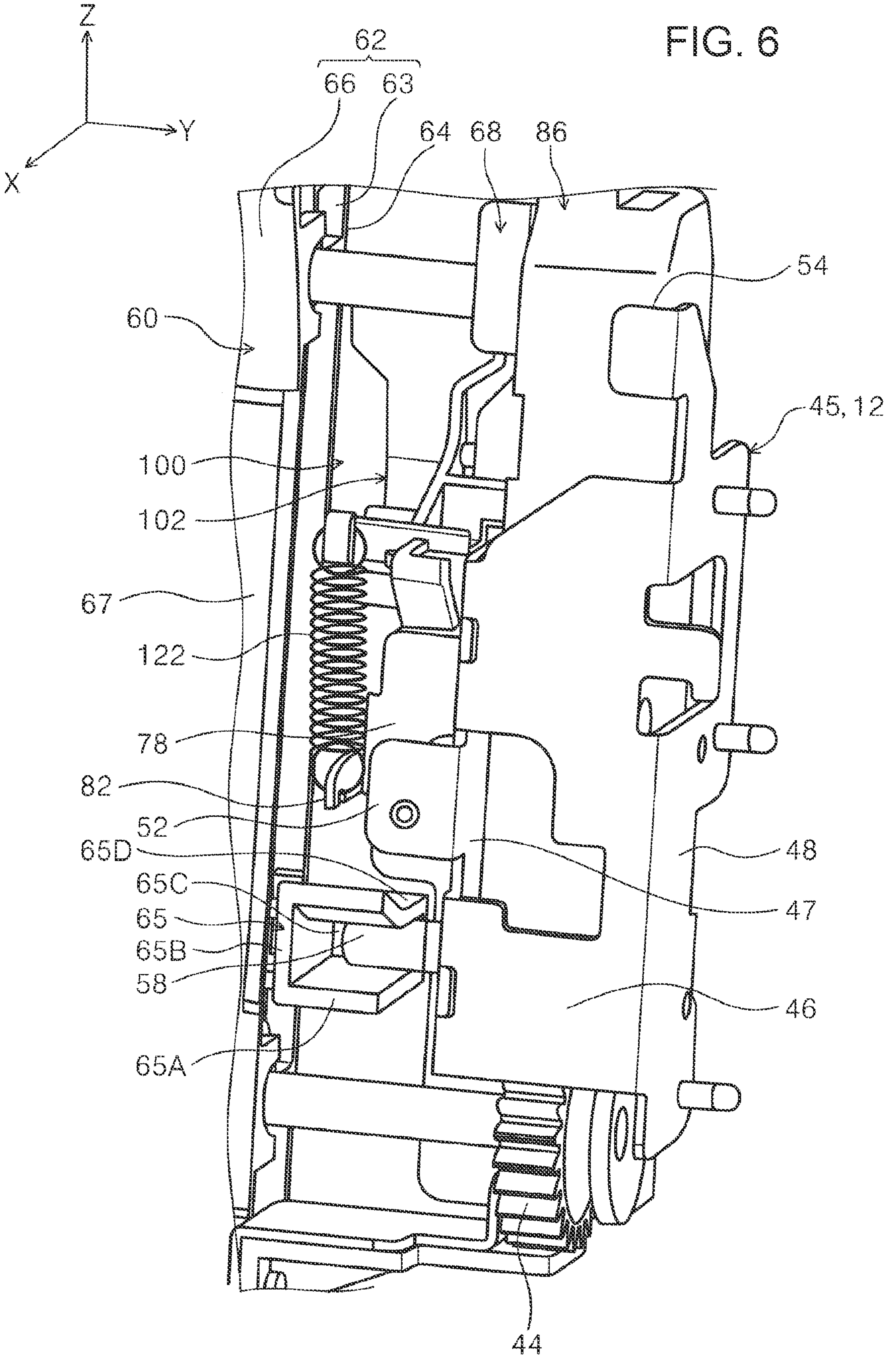
FIG. 6 is a perspective view showing how the gear section and a main body bracket are in contact with each other in the printer according to the embodiment.
Figure 7:
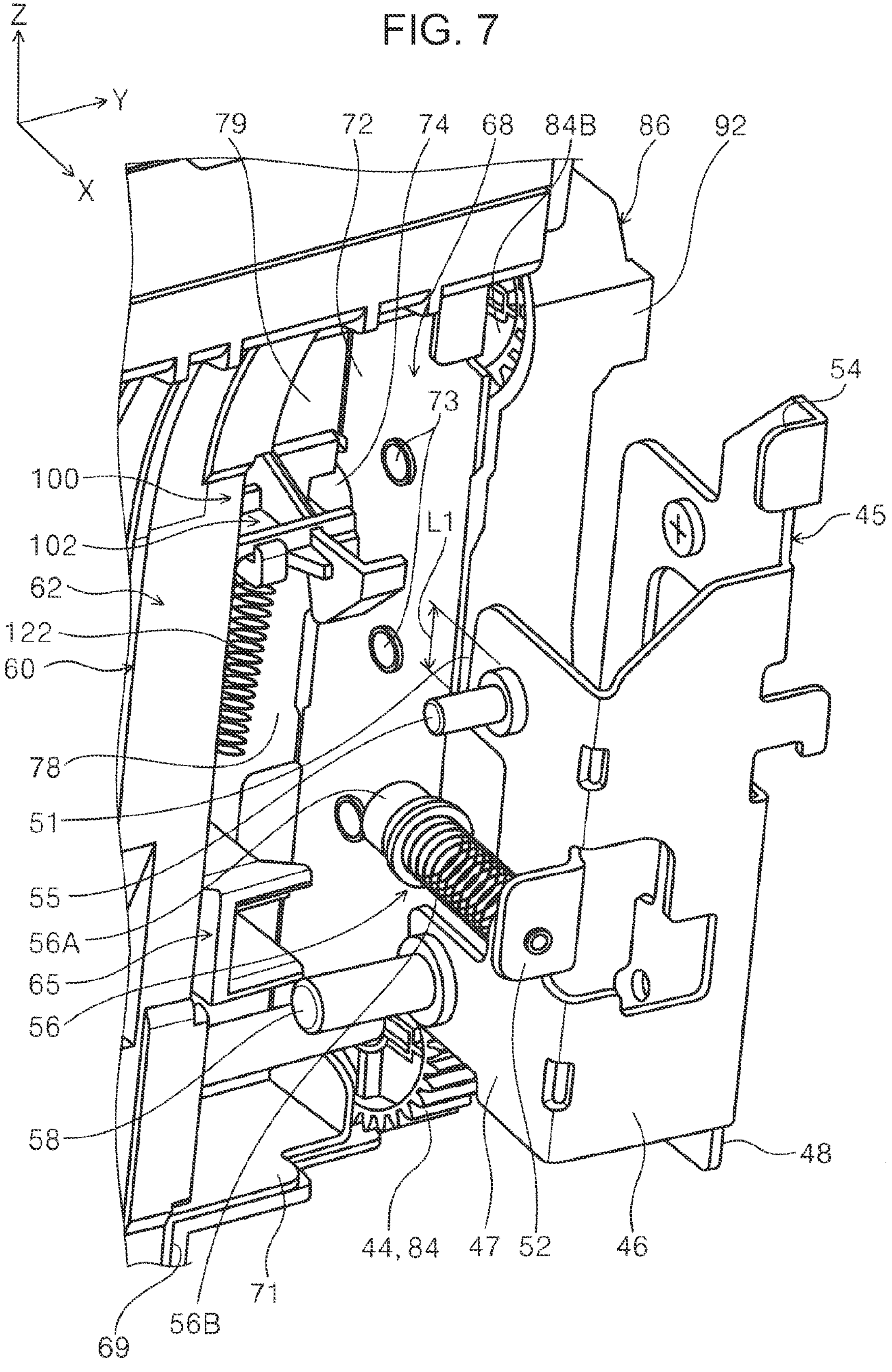
FIG. 7 is a perspective view showing a state where the gear section is decoupled from the main body bracket in the printer according to the embodiment.

As shown in FIGS. 6 and 7, the main body bracket 45 is a member fixed to a +Y-direction end portion of the main body frame 14 (FIG. 1). By way of example, the main body bracket 45 is formed by bending sheet metal and has a vertical wall 46, a side wall 47, a side wall 48, and a projecting portion 52. The main body bracket 45 is also provided with a first abutment portion 51, a second abutment portion 54, a counter-engagement shaft 55, a damper 56, and a third abutment portion 58.

The vertical wall 46 is along the Y-Z plane and extends in the Z-direction. The side wall 47 extends in the −X-direction from a −Y-direction end portion of the vertical wall 46. The side wall 48 extends in the −X-direction from a +Y-direction end portion of the vertical wall 46. The main body bracket 45 is thus formed in a letter-U shape opening in the −X-direction when seen in the Z-direction. Note that a −X-direction end portion of a part of the side wall 47 which is on the +Z-direction side of the Z-direction center of the side wall 47 is referred to as the first abutment portion 51.

The first abutment portion 51 is an example of the restriction portion, and when the inner door unit 60 is in the closed state, comes into contact with a support shaft portion 74 (FIG. 7) to be described later in the −X-direction, thereby restricting the inner door unit 60 from moving too far in the +X-direction.

The projecting portion 52 is a part projecting in the −Y-direction from a +X-direction end portion of a Z-direction center portion of the side wall 47. The projecting portion 52 is formed in a plate shape having a predetermined thickness in the X-direction.

The second abutment portion 54 is a part projecting in the −Y-direction from a +X-direction end portion of a +Z-direction end portion of the side wall 48. The second abutment portion 54 is located on the +Z-direction side relative to the vertical wall 46 and is formed in a plate shape having a predetermined thickness in the X-direction. The second abutment portion 54 is an example of the restriction portion, and when the inner door unit 60 is brought to the closed state, comes into contact with a counter-abutment portion 92 of a cover member 86 to be described later in the −X-direction, thereby restricting the inner door unit 60 from moving too far in the +X-direction.

The counter-engagement shaft 55 is an example of the counter-engagement portion, and is a columnar member which is long in the Y-direction which is an example of the first direction. The counter-engagement shaft 55 is provided at a part of the side wall 47, the part being on the +Z-direction side of the Z-direction center of the side wall 47 and on the −X-direction side of the X-direction center of the side wall 47. The counter-engagement shaft 55 extends in the −Y-direction from the side wall 47. The height position of the counter-engagement shaft 55 in the Z-direction is lower than the height position of the second abutment portion 54 in the Z-direction. Note that the counter-engagement shaft 55 is included in the lock mechanism section 100 to be described later.

In the closed state of the inner door unit 60, the counter-engagement shaft 55 is at a position overlapping with the first abutment portion 51 over the range of a length L1 (FIG. 7) in the Z-direction.

The damper 56 (FIG. 7) is attached to the projecting portion 52 and extends in the −X-direction from the projecting portion 52. By way of example, the damper 56 has a contact portion 56A and a spring portion 56B. The contact portion 56A is made of, by way of example, a resin member formed in a columnar shape extending in the X-direction. The −X-direction end surface of the contact portion 56A is a planar surface along the Y-Z plane. The contact portion 56A is brought into contact with a first restriction plate portion 78 to be described later in the −X-direction.

The spring portion 56B is attached to the projecting portion 52 at one end in the X-direction and is attached to the contact portion 56A at the other end, thereby being elastically deformable in the X-direction.

The height position of the damper 56 in the Z-direction is lower than the height position of the counter-engagement shaft 55 in the Z-direction.

The third abutment portion 58 is provided at a −X-direction end portion of a part of the side wall 47 which is on the −Z-direction side of the Z-direction center of the side wall 47. The third abutment portion 58 is formed in a columnar shape and extends in the −Y-direction from the side wall 47. The diameter of the third abutment portion 58 is, by way of example, larger than that of the counter-engagement shaft 55. The length of the third abutment portion 58 in the Y-direction is, by way of example, longer than the length of the counter-engagement shaft 55 in the Y-direction. The height position of the third abutment portion 58 in the Z-direction is lower than the height position of the damper 56 in the Z-direction.

The third abutment portion 58 is an example of the restriction portion, and when the inner door unit 60 is brought into the closed state, comes into contact with a guide portion 65 to be described later in the −X-direction, thereby restricting the inner door unit 60 from moving too far in the +X-direction.

As shown in FIG. 3, the inner door unit 60 is an example of the door, and is a unit coupled to the apparatus main body 12 in a manner rotatable about a rotation axis C1 and is configured to be switchable between the open state and the closed state. Specifically, the inner door unit 60 is configured including a frame portion 62, the guide portion 65 (FIG. 6), a rotation shaft 61, a support bracket 68, the gear section 84 (FIG. 5), the cover member 86 (FIG. 7), the pinch rollers 94, and press springs 96 (FIG. 4). Note that in the description of the inner door unit 60, the positions of its members are described regarding their positions when the inner door unit 60 is in the closed state.

The closed state of the inner door unit 60 is a state in which the inner door unit 60 housed in the apparatus main body 12 is locked against the apparatus main body 12 by the lock mechanism section 100 to be described later and is a state in which the inner door unit 60 forms the discharge path T2 (FIG. 1) together with the apparatus main body 12.

The open state of the inner door unit 60 is a state in which the inner door unit 60 is unlocked from the apparatus main body 12 and a state in which the discharge path T2 is exposed.

The frame portion 62, as seen in the X-direction, is formed in a rectangular shape whose dimension in the Y-direction is longer than its dimension in the Z-direction. The frame portion 62 is configured including, by way of example, a first frame 63 and a second frame 66.

The first frame 63 forms a −X-direction part of the frame portion 62. The first frame 63 has a vertical wall 64 extending upright along the Y-Z plane. The vertical wall 64 is provided with the plurality of pinch rollers 94 and the plurality of press springs 96 to be described later.

The second frame 66 (FIG. 6) forms a +X-direction part of the frame portion 62. The second frame 66 has a vertical wall 67 extending upright along the Y-Z plane. The vertical wall 67 is provided with the plurality of transport rollers 24A (FIG. 1) in such a manner that they are rotatable.

As shown in FIG. 6, the guide portion 65 is provided at a +Y-direction end portion of the vertical wall 64.

The guide portion 65 has a bottom wall 65A along the X-Y plane, a side wall 65B that stands upright in the +Z-direction at a −Y-direction end portion of the bottom wall 65A, a front wall 65C that stands upright in the +Z-direction at a −X-direction end portion of the bottom wall 65A, and an upper wall 65D that is continuous with the side wall 65B and the front wall 65C and is located on the +Z-direction side relative to the bottom wall 65A. In other words, the guide portion 65 is a chamber portion that is open in both the +X-direction and the +Y-direction. The interval between the bottom wall 65A and the upper wall 65D in the Z-direction increases more and more in the +X-direction.

The guide portion 65 is sized so that the third abutment portion 58 can be inserted thereto, and guides the third abutment portion 58 in the X-direction.

Guided by the guide portion 65, the third abutment portion 58 abuts against the front wall 65C, thereby restricted from moving in the −X-direction.

As shown in FIG. 3, the rotation shaft 61 is provided at a −Y-direction end portion of the frame portion 62. The rotation shaft 61 is formed in a columnar shape and extends in the Z-direction. The rotation shaft 61 is rotatably provided at part of the main body frame 14. The rotation shaft 61 has the rotation axis C1 passing through the center of the shaft. This enables the inner door unit 60 to be switched between the open state and the closed state described above by rotating about the rotation axis C1.

The support bracket 68 is attached to a +Y-direction end portion of the frame portion 62 using a screw (not shown).

As shown in FIG. 7, the support bracket 68 is configured including a vertical plate portion 69, a lateral plate portion 71, a support plate portion 72, the support shaft portion 74, the first restriction plate portion 78, a second restriction plate portion 79, and a hook portion 82 (FIG. 6).

The vertical plate portion 69 is attached to a +Y-direction end portion of a −Z-direction part of the frame portion 62. The lateral plate portion 71 extends in the +Y-direction from a +Z-direction end portion of the vertical plate portion 69.

The support plate portion 72 extends upright in the +Z-direction from a +Y-direction end portion of the lateral plate portion 71. The support plate portion 72 is provided with a plurality of shaft portions 73 that extend in the +Y-direction and are arranged side by side in the Z-direction. The plurality of shaft portions 73 support the gears (not shown) of the gear section 84 to be described later in such a manner that the gears are rotatable. The support shaft portion 74 is provided at a +Z-direction portion of the support plate portion 72.

The support shaft portion 74 is formed in a tubular shape opening in the Y-direction. Part of a shaft 76 (FIG. 8) is fit into the support shaft portion 74. Thus, the support bracket 68 supports the shaft 76.

The first restriction plate portion 78 extends in the −Y-direction from a −X-direction end portion of a center portion and a lower portion, in the Z-direction, of the support plate portion 72. The contact portion 56A described earlier comes into contact with part of the first restriction plate portion 78. Then, when the contact portion 56A is in contact with the first restriction plate portion 78, the first restriction plate portion 78 restricts the contact portion 56A from moving in the −X-direction beyond the first restriction plate portion 78.

The second restriction plate portion 79 extends in the −Y-direction from a −X-direction end portion of an upper portion, in the Z-direction, of the support plate portion 72. A front wall portion 111 and a rear wall portion 114 (FIG. 9) to be described later come into contact with part of the second restriction plate portion 79. When the front wall portion 111 is in contact with the second restriction plate portion 79, the second restriction plate portion 79 restricts the front wall portion 111 from moving in the −X-direction beyond the second restriction plate portion 79. Also, when the rear wall portion 114 is in contact with the second restriction plate portion 79, the second restriction plate portion 79 restricts the rear wall portion 114 from moving in the +X-direction beyond the second restriction plate portion 79.

The hook portion 82 (FIG. 8) is a part projecting in the +X-direction from a −Y-direction end portion of the first restriction plate portion 78. The hook portion 82 is formed in an inverted letter-U shape opening in the −Z-direction. Note that the hook portion 82 is located on the +Z-direction side relative to the guide portion 65.

The gear section 84 has the transmission gear 44 mentioned earlier, a plurality of transmission gears 84A (FIG. 11), a drive gear 84B, and a plurality of gears (not shown). The transmission gear 44 is disposed at a −Z-direction end portion of the gear section 84. The drive gear 84B is disposed at a +Z-direction end portion of the gear section 84. The plurality of gears transmit a drive force from the transmission gear 44 to the drive gear 84B via the plurality of transmission gears 84A.

The cover member 86 has a first side wall 87, a second side wall 88, and a third side wall 89 (FIG. 5).

The first side wall 87 is located on the +X-direction side relative to the gear section 84. The second side wall 88 is located on the −X-direction side relative to the gear section 84. The third side wall 89 is disposed at a +Y-direction side relative to the gear section 84, and couples the first side wall 87 and the second side wall 88 to each other in the X-direction. The cover member 86 thus covers the gear section 84 from three sides. The counter-abutment portion 92 is formed at a part of the first side wall 87 which is on the +Y-direction side and the +Z-direction side of the center of the first side wall 87 when seen in the +X-direction.

The counter-abutment portion 92 is a part protruding from the first side wall 87 in the +X-direction. When the inner door unit 60 is in the closed state, the counter-abutment portion 92 is a part against which the second abutment portion 54 abuts in the −X-direction.

As shown in FIG. 4, the pinch rollers 94 are an example of the rotatable roller and each have a columnar shaft portion 94A extending in the Y-direction, a wider diameter portion 94B increased in diameter radially from the shaft portion 94A, and a plurality of teeth 94C formed at the outer circumferential surface of the wider diameter portion 94B. In a state where the inner door unit 60 is receiving a pressing force from the outer door unit 30, the pinch rollers 94, together with the rubber rollers 36, transport a sheet P by pinching the sheet P and rotating.

The press springs 96 are each attached to the first frame 63 at one end and is in contact with the shaft portion 94A at the other end, thereby being elastically deformable in the X-direction. Then, the press spring 96 applies an elastic force to the shaft portion 94A, thereby pressing the shaft portion 94A toward the rubber rollers 36. In other words, the press spring 96 is an example of the press member and presses the pinch roller 94 against the outer door unit 30. Note that the plurality of pinch rollers 94 and the plurality of press springs 96 are disposed at the inner door unit 60.

As shown in FIG. 6, the lock mechanism section 100 brings the inner door unit 60 into the closed state by locking the inner door unit 60 against the apparatus main body 12 and brings the inner door unit 60 into the open state by unlocking the inner door unit 60 from the apparatus main body 12. Specifically, the lock mechanism section 100 includes the counter-engagement shaft 55 (FIG. 9) described earlier, a lock lever 102, and a tension spring 122.

Figure 9:
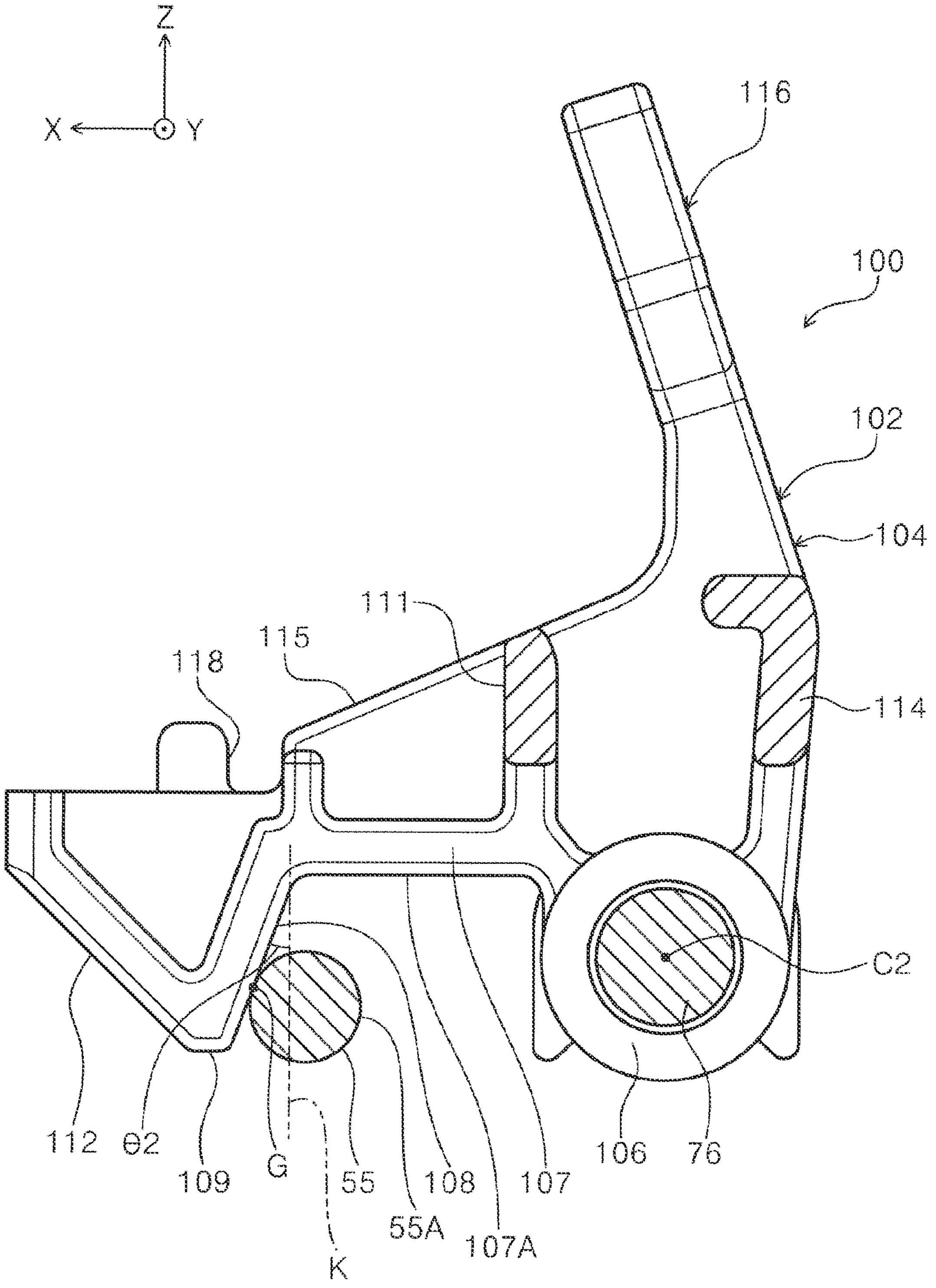
FIG. 9 is a side view of a lock lever in the printer according to the embodiment.

As shown in FIG. 9, the lock lever 102 is an example of the engagement portion and has an engagement surface 108 to be described later. The lock lever 102 has the shaft 76 and a lever main body 104 that rotates about the axial center of the shaft 76. The shaft 76 is, as described earlier, supported by the support bracket 68 (FIG. 7). Thus, the lock lever 102 is provided at the inner door unit 60 (FIG. 1). Note that the positions of the portions of the lock lever 102 are described regarding their positions when the inner door unit 60 is in the closed state.

The shaft 76 is formed in a columnar shape and extends in the Y-direction. The shaft 76 has a rotation central axis C2 passing through the center of the shaft and extending in the Y-direction. In other words, the lock lever 102 has the central axis C2 of rotation relative to the inner door unit 60. When the inner door unit 60 is in the closed state, the rotation central axis C2 is orthogonal to the rotation axis C1 (FIG. 3) when seen in the +X-direction from the −X-direction side.

Note that when seen in the −Y-direction from the +Y-direction side, the direction in which the inner door unit 60 is moved from an open position for the open state to a closed position for the closed state is the +X-direction.

The lever main body 104, as seen in +Y-direction, includes an insertion portion 106, a bottom wall 107, the engagement surface 108, an anterior surface 112, a connection surface 109, the front wall portion 111, the rear wall portion 114, a partitioning portion 115, a grip portion 116, and a hook portion 118. In the present embodiment, engagement is a concept including contact.

The insertion portion 106 is a tubular part that opens in the Y-direction. The shaft 76 is inserted into the insertion portion 106. The insertion portion 106 is rotatable in the circumferential direction of the shaft 76.

The bottom wall 107 extends in the +X-direction from the outer circumferential surface of the insertion portion 106. The bottom wall 107 has a bottom portion 107A along the X-Y plane.

The engagement surface 108 is, by way of example, a planar surface. The engagement surface 108 can change its position between a first posture and a second posture to be described later, when the lock lever 102 is rotated in the X-direction intersecting with the Y-direction, the X-direction being an example of the second direction. The engagement surface 108 is engageable with the counter-engagement shaft 55. Further, in a closing operation of the inner door unit 60, the engagement surface 108 changes its position from the first posture to the second posture while shifting a position of contact G with the counter-engagement shaft 55. Also, in the closing operation and the closed state of the inner door unit 60, the engagement surface 108 exerts, to the counter-engagement shaft 55, a pull-in force for moving the inner door unit 60 to the closed position.

Figure 12A:
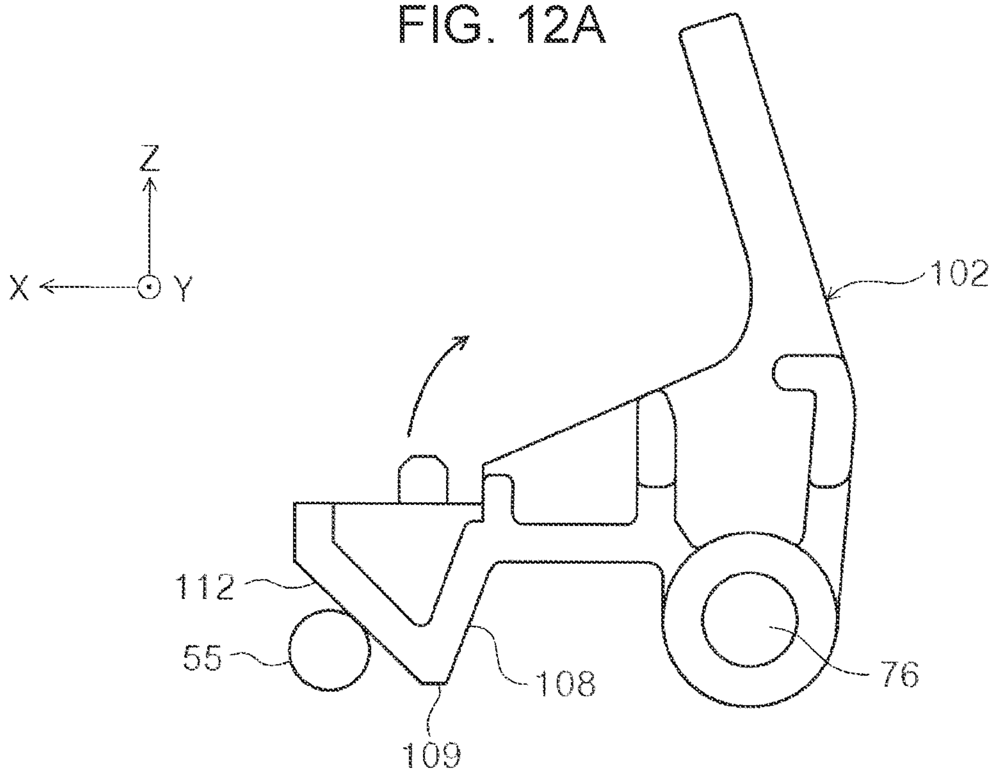
FIG. 12A is a schematic diagram showing a state where an anterior surface of the lock lever is in contact with a counter-engagement shaft in the printer according to the embodiment.
Figure 12B:
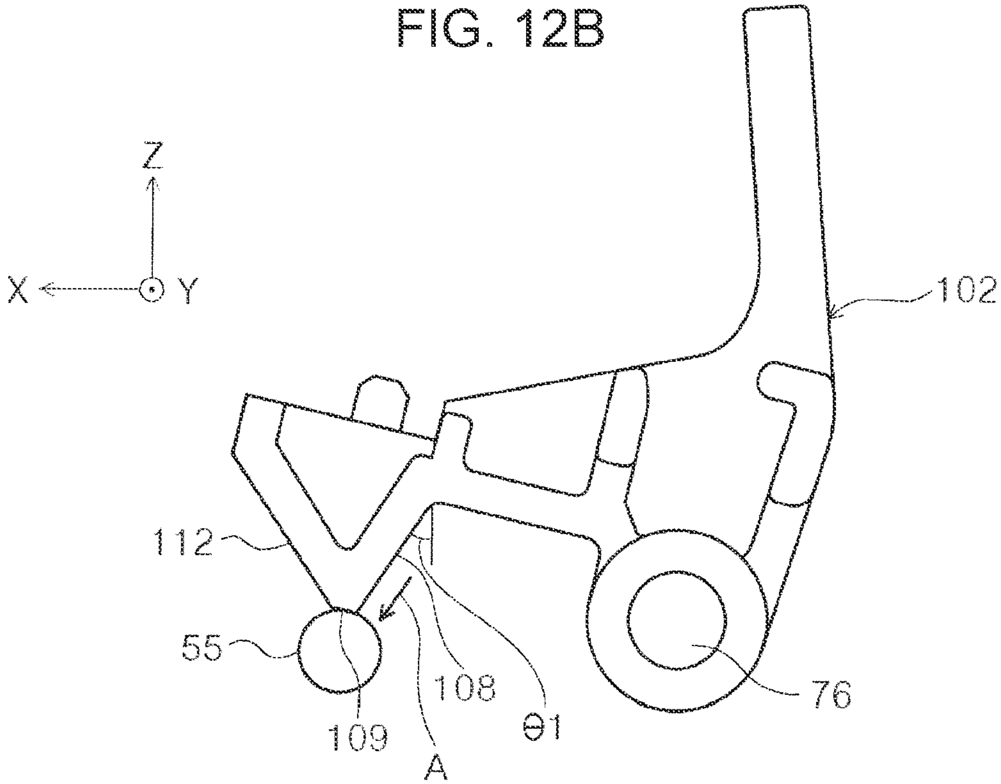
FIG. 12B is a schematic diagram showing a state where the lock lever is climbing over the counter-engagement shaft in the printer according to the embodiment.

As shown in FIG. 12B, the first posture of the engagement surface 108 means the posture assumed by the engagement surface 108 when the connection surface 109 to be described later reaches the +Z-direction vertex of the counter-engagement shaft 55. In this posture, the engagement surface 108 is slanted with its +X-direction end portion being located on the −Z-direction side relative to its −X-direction end portion. In other words, the engagement surface 108 is, when seen in the +Y-direction, a slanted surface extending in an intersecting direction intersecting with the Z-direction. This intersecting direction is referred to as an A-direction. An angle θ1 formed between the Z-direction and the A-direction is larger than 0 [°] and smaller than 45 [°]. The angle θ1 is, by way of example, 20 [°].

As shown in FIG. 9, the second posture of the engagement surface 108 means the posture assumed by the engagement surface 108 when the inner door unit 60 is in the closed state and when the engagement surface 108 engages with the counter-engagement shaft 55. In this posture, the engagement surface 108 is slanted with its +X-direction end portion being located on the −Z-direction side relative to its −X-direction end portion. An acute angle formed between the engagement surface 108 in this posture and an imaginary line K extending in the Z-direction is referred to an angle θ2. The angle θ2 is smaller than the angle θ1 (FIG. 12B).

When seen in the Y-direction which is the axial direction of the rotation central axis C2, the engagement surface 108 in the second posture extends to both sides of the position of contact G with the counter-engagement shaft 55 in the slanting direction included in the in-plane direction of the engagement surface 108.

In a transition from the first posture to the second posture, the engagement surface 108 comes into contact with an outer circumferential surface 55A of the counter-engagement shaft 55. The posture assumed by the engagement surface 108 when the engagement surface 108 starts contacting the outer circumferential surface 55A is referred to as a third posture.

The engagement surface 108 in the third posture exerts, to the counter-engagement shaft 55, a pull-in force for moving the inner door unit 60 from the open state to the closed state.

Figure 8:
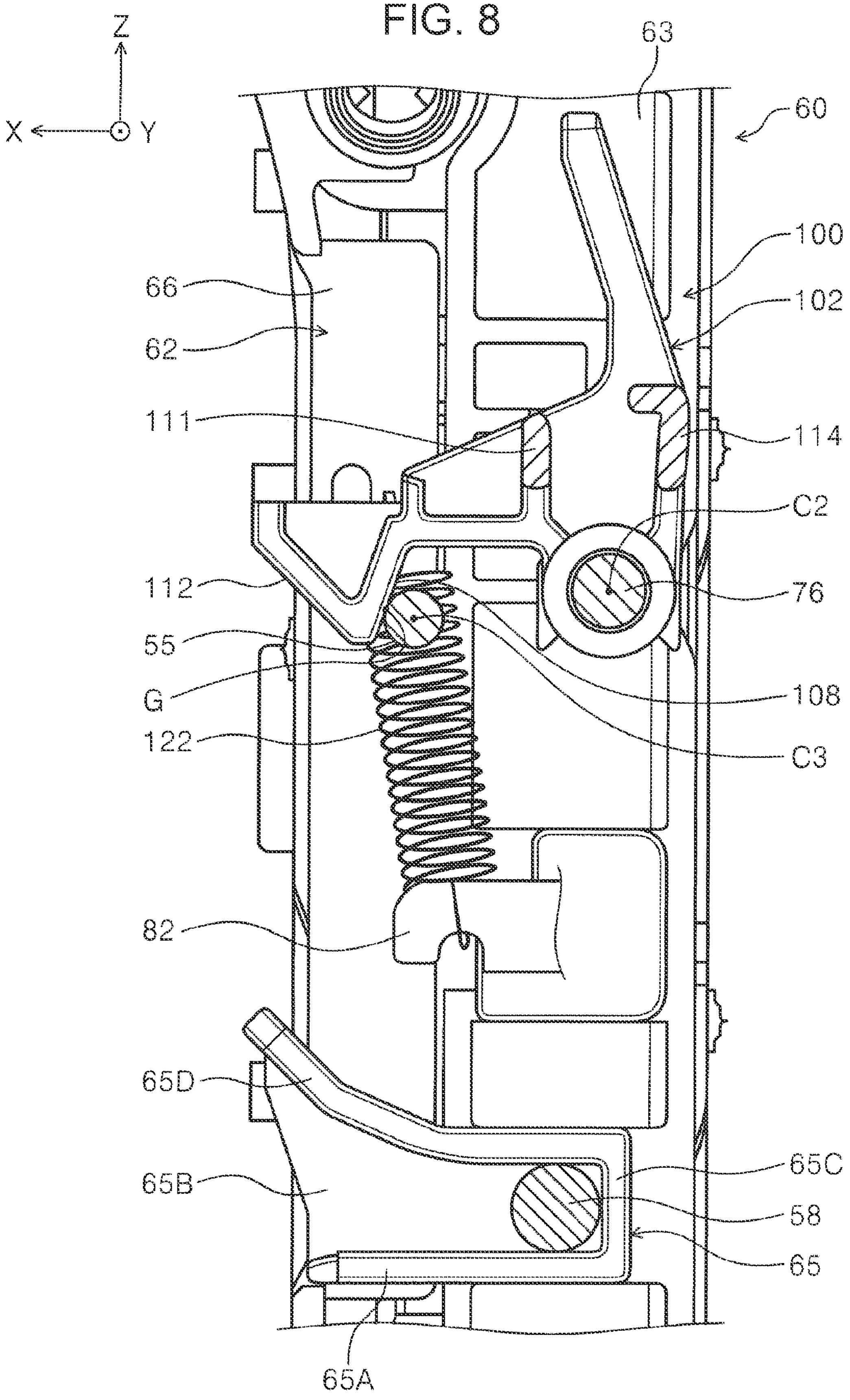
FIG. 8 is a vertical sectional view of an inner door unit in the printer according to the embodiment, seen from the side.

As shown in FIG. 8, when the inner door unit 60 is in the closed state, the position of contact G between the engagement surface 108 and the counter-engagement shaft 55 is located lower than the rotation central axis C2 in the Z-direction.

When the inner door unit 60 is in the closed state, the position of contact G is located higher than a central axis C3 of the counter-engagement shaft 55 in the Z-direction.

As shown in FIG. 9, the anterior surface 112 is formed at a +X-direction and −Z-direction end portion of the lever main body 104. The anterior surface 112 is, when seen in the +Y-direction, slanted with its +X-direction end portion being located on the +Z-direction side relative to its −X-direction end portion. The anterior surface 112 is, by way of example, a planar surface.

When the state of the inner door unit 60 switches from the open state to the closed state, the anterior surface 112 comes into contact with the counter-engagement shaft 55 before the engagement surface 108 does.

As shown in FIG. 12A, when the anterior surface 112 comes into contact with the counter-engagement shaft 55, the lock lever 102 receives, from the counter-engagement shaft 55, a reactive force in a rotational direction in which the engagement surface 108 is moved from the second posture to the first posture.

As shown in FIG. 9, the connection surface 109 is, in the closed state described above, a planar surface extending in the +X-direction from a +X-direction end portion of the engagement surface 108, and is coupled to a −X-direction end portion of the anterior surface 112. The length of the connection surface 109 in the X-direction is, by way of example, shorter than a length corresponding to the diameter of the counter-engagement shaft 55.

In a transition from a state where the counter-engagement shaft 55 is in contact with the anterior surface 112 to a state where the counter-engagement shaft 55 is in contact with the engagement surface 108, or vice versa, a moderate clicking sensation can be produced during the manipulation of the lock lever 102 due to the formation of the connection surface 109.

The front wall portion 111 extends upright in the +Z-direction from a −X-direction end portion of the bottom wall 107.

The rear wall portion 114 extends upright in the +Z-direction from a −X-direction end portion of the insertion portion 106. A +Z-direction end portion of the rear wall portion 114 is bent in the +X-direction. The rear wall portion 114 is located on the −X-direction side relative to the front wall portion 111. The second restriction plate portion 79 (FIG. 7) described earlier is inserted between the front wall portion 111 and the rear wall portion 114.

Figure 11:
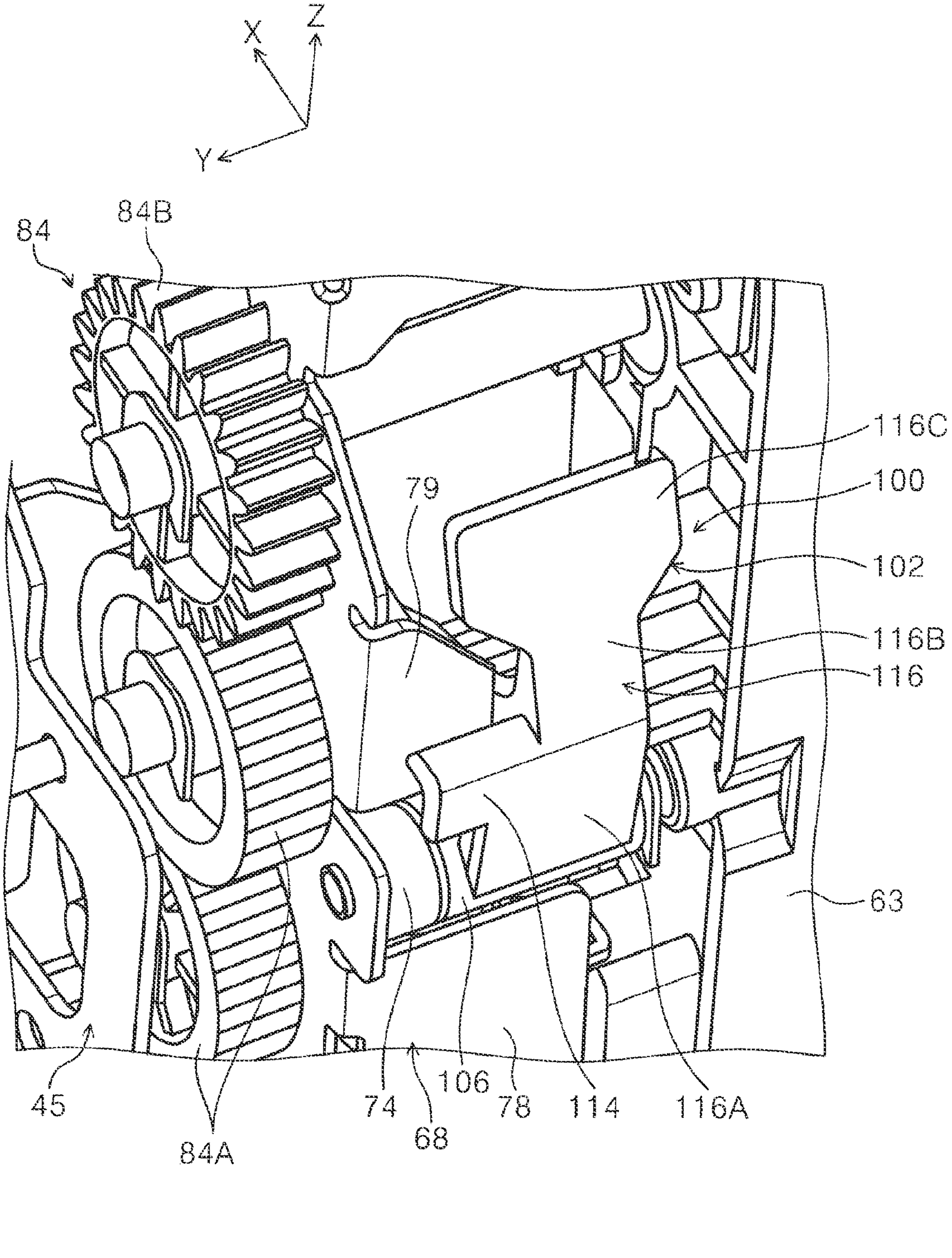
FIG. 11 is a perspective view showing the arrangement of the lock lever and a support bracket in the printer according to the embodiment.

As shown in FIG. 11, when the inner door unit 60 is in the closed state, the bent part of the rear wall portion 114 is in contact with the second restriction plate portion 79 in the +X-direction from the −X-direction side. The lock lever 102 is thereby restricted from rotating too far in the +X-direction. Note that the second restriction plate portion 79 is disposed such that the anterior surface 112 (FIG. 9) is not located on the −Z-direction side relative to the counter-engagement shaft 55 (FIG. 9).

When the lock lever 102 is rotated in the −X-direction, the front wall portion 111 (FIG. 9) comes into contact with the second restriction plate portion 79 in the −X-direction from the +X-direction side. The lock lever 102 is thereby restricted from rotating too far in the −X-direction.

FIG. 11 does not show the cover member 86 (FIG. 7).

Figure 10:
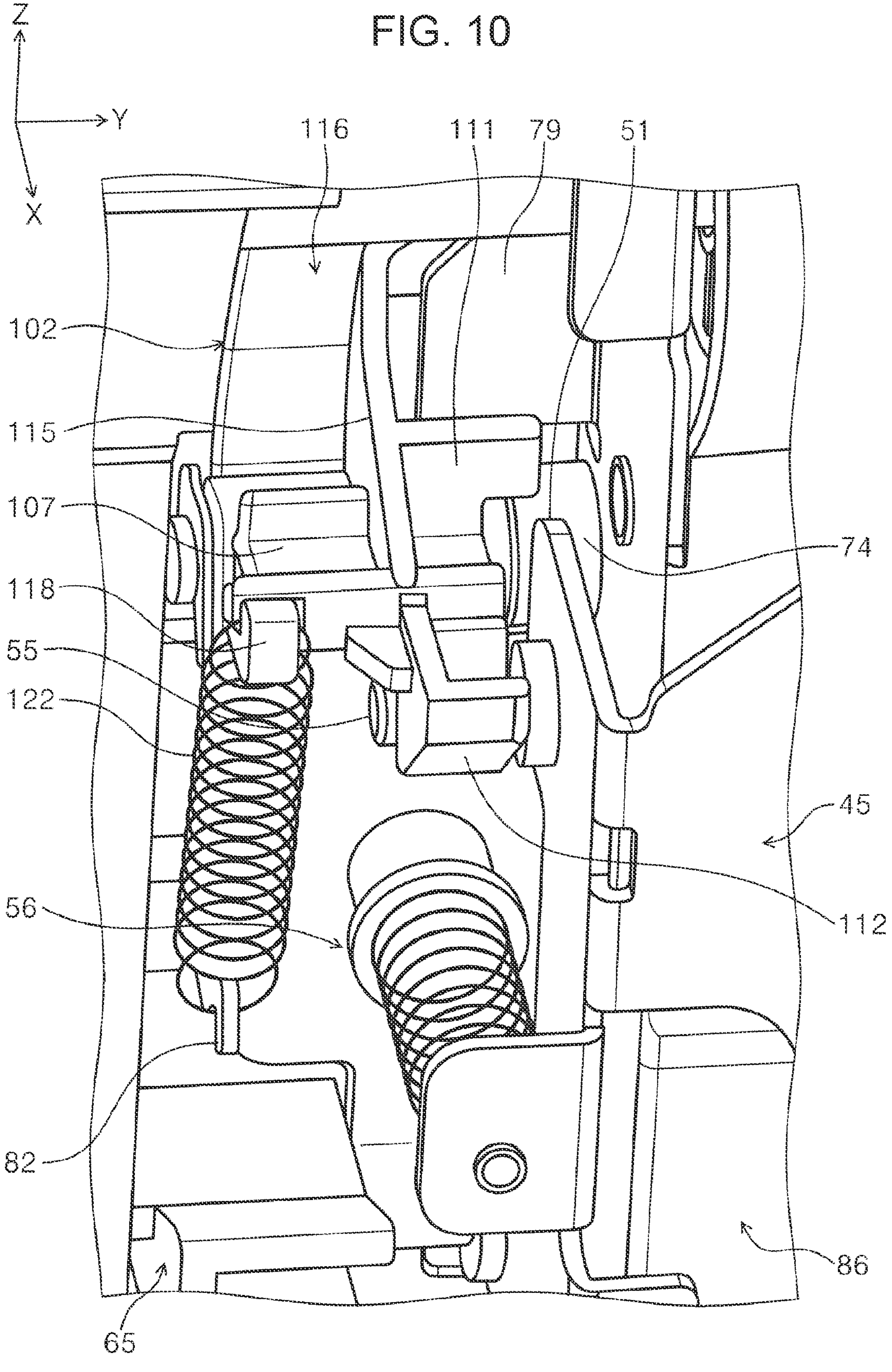
FIG. 10 is a perspective view showing a state where the inner door unit abuts against the main body bracket in the printer according to the embodiment.

As shown in FIG. 10, the partitioning portion 115 extends upright in the +Z-direction from the Y-direction center of the bottom wall 107, partitioning the lock lever 102 into a part on the +Y-direction side and a part on the −Y-direction side of the center of the lock lever 102 in the Y-direction. The part on the +Y-direction side includes the engagement surface 108 (FIG. 9), the connection surface 109 (FIG. 9), and the anterior surface 112. The part on the −Y-direction side includes the grip portion 116 and the hook portion 118.

As shown in FIG. 11, the grip portion 116 has a vertical wall portion 116A extending upright in the +Z-direction from the outer circumferential surface of the insertion portion 106, a slanted portion 116B extending obliquely from a +Z-direction end portion of the vertical wall portion 116A toward a +X-direction and +Z-direction position, and a projecting portion 116C projecting from a +Z-direction part of the slanted portion 116B to both sides in the Y-direction.

As shown in FIG. 10, the hook portion 118 is formed at the bottom wall 107, on the +X-direction side relative to the grip portion 116. The hook portion 118 is a part cut out in a letter-U shape opening in the +Z-direction when seen in the Y-direction. The upper end of the tension spring 122 to be described later is hooked to the hook portion 118. When seen in the Y-direction, a portion of the hook portion 118 to be in contact with the tension spring 122 is disposed next to the engagement surface 108 (FIG. 9) in the Z-direction.

The tension spring 122 is an example of the application member and applies a force to the lock lever 102 so that the engagement surface 108 can change its position from the first posture to the second posture described above. Specifically, the lower end of the tension spring 122 is hooked to the hook portion 82, and the upper end of the tension spring 122 is hooked to the hook portion 118. The lock lever 102 thereby receives a force in a direction such that the engagement surface 108 is pressed against the outer circumferential surface 55A of the counter-engagement shaft 55.

Next, the operation of the printer 10 is described.

Note that for the configurations of the components of the printer 10, FIGS. 1 to 12B are to be referred to, and the numbers of the drawings are not described below.

For an operation to open the inner door unit 60 in the closed state, an operator grips and tilts the grip portion 116 in the −X-direction against the pulling force exerted by the tension spring 122, thereby rotating the lock lever 102 in the −X-direction. In this event, the engagement surface 108 moves while shifting the position of contact G with the outer circumferential surface 55A in the +Z-direction and then moves away from the outer circumferential surface 55A. Then, the connection surface 109 climbs over the counter-engagement shaft 55 in the −X-direction, so that the lock lever 102 and the counter-engagement shaft 55 are disengaged from each other, enabling the opening operation of the inner door unit 60.

For an operation to close the inner door unit 60 in the open state, an operator pushes a +Y-direction end portion of the inner door unit 60 in the +X-direction, thereby rotating the inner door unit 60 toward the closed position. Note that for the closing operation, the lock lever 102 is not operated by the operator.

When the inner door unit 60 approaches the closed position, the anterior surface 112 comes into contact with the outer circumferential surface 55A in the +X-direction. In this event, the anterior surface 112 receives a reactive force from the counter-engagement shaft 55, so that the lock lever 102 rotates in the −X-direction. Then, the connection surface 109 climbs over the counter-engagement shaft 55 in the +X-direction, and the engagement surface 108 comes into contact with the outer circumferential surface 55A. In this event, the engagement surface 108 moves to the position for the closed state while shifting the position of contact G by generating a pull-in force. As a result, the lock lever 102 engages with the counter-engagement shaft 55, bringing the inner door unit 60 into the closed state.

In this way, in the closing operation and in the closed state, the engagement surface 108 applies, to the counter-engagement shaft 55, a pull-in force for moving the inner door unit 60 to the closed state.

In the printer 10, the pull-in force remains exerted in the closed state, which makes it unlikely for the inner door unit 60 to be opened by mistake.

As thus described, according to the printer 10, when the inner door unit 60 is operated from the open position to the closed position, the engagement surface 108 comes into contact with the counter-engagement shaft 55. As the inner door unit 60 approaches the closed position, the engagement surface 108 changes its posture from the first posture to the second posture. The engagement surface 108 changes its posture from the first posture to the second posture while shifting the position of contact G with the counter-engagement shaft 55. In other words, the engagement surface 108 changes its posture with the engagement surface 108 and the counter-engagement shaft 55 staying in contact with each other. Thus, there is no need for the lock lever 102 to overstroke in the +X-direction.

The elimination of the need for the overstroke of the lock lever 102 can reduce the interference between the main body gear 42 and the transmission gear 44.

According to the printer 10, the rotation central axis C2 of the lock lever 102 is immobile. Thus, compared to a configuration in which the whole lock lever 102 slides, the mechanism for moving the lock lever 102 can be simplified.

According to the printer 10, because the anterior surface 112 comes into contact with the counter-engagement shaft 55, the engagement surface 108 and the counter-engagement shaft 55 transition into a contacting state after the lock lever 102 is rotated in a direction in which the engagement surface 108 is moved from the second posture to the first posture. In other words, the lock lever 102 can easily rotate before the engagement surface 108 and the counter-engagement shaft 55 come into contact with each other, which makes it easy for the engagement surface 108 and the counter-engagement shaft 55 to transition into a contacting state.

According to the printer 10, when the inner door unit 60 is moved from the open state to the closed state, the area of contact between the engagement surface 108 and the counter-engagement shaft 55 gradually increases, and also the friction force acting on the engagement surface 108 gradually increases in comparison to the configuration in which the lock lever 102 slides. Thus, a feel of jerkiness felt when the inner door unit 60 is brought into the closed state can be reduced.

According to the printer 10, the rotation central axis C2, which is the center of rotation of the lock lever 102, is located higher than the position of contact G between the engagement surface 108 and the counter-engagement shaft 55 in the Z-direction. This makes it easier for the engagement surface 108 to move away from the counter-engagement shaft 55 at the time of unlocking and thus makes unlocking easier.

According to the printer 10, the first abutment portion 51, the second abutment portion 54, and the third abutment portion 58 restrict the movement of the inner door unit 60 in the closed state. Since the counter-engagement shaft 55 is at a position overlapping with the first abutment portion 51 in the Z-direction, the position of contact G between the engagement surface 108 and the counter-engagement shaft 55 and the position where the first abutment portion 51 restricts the inner door unit 60 are closely disposed. This helps prevent overstroke operation of the inner door unit 60 in the +X-direction when the engagement surface 108 and the counter-engagement shaft 55 come into contact with each other.

According to the printer 10, even if the position of contact G between the engagement surface 108 and the counter-engagement shaft 55 is displaced, the engagement surface 108 and the counter-engagement shaft 55 can be brought into contact with each other because the engagement surface 108 extends to both sides of the position of contact G.

According to the printer 10, regarding the force acting on the position of contact G between the engagement surface 108 and the counter-engagement shaft 55, a component force in a horizontal direction orthogonal to the Z-direction is large compared to a configuration in which the angle θ1 formed between the Z-direction and the A-direction exceeds 45°. Thus, it is easier to obtain a pull-in force exerted when the lock lever 102 comes into contact with the counter-engagement shaft 55.

According to the printer 10, the outer door unit 30 presses the inner door unit 60 in the closed state against the apparatus main body 12, thereby restricting the inner door unit 60 from moving to the open position. Thus, the inner door unit 60 can stay in the closed state.

According to the printer 10, the pinch rollers 94 are pressed against the rubber rollers 36 by receiving a pressing force from the press springs 96 while in contact with the rubber rollers 36. Even if the outer door unit 30 is operated to overstroke relative to the inner door unit 60, the press springs 96 elastically deform and thereby can absorb the pressing force that the rubber rollers 36 exert to the pinch rollers 94. Thus, deformation of the pinch rollers 94 can be reduced.

According to the printer 10, even if a sheet P is jammed during transport, opening the inner door unit 60 or the outer door unit 30 makes it possible to remove the recorded sheet P and therefore unlikely for the recorded sheet P to remain in the discharge path T2 or in the feed-in path T4 and the switch-back path T5.

According to the printer 10, the line head 28 performs recording on a sheet P transported thereto. Even if the recorded sheet P is jammed during transport, opening the inner door unit 60 or the outer door unit 30 makes it possible to remove the recorded sheet P and therefore unlikely for the recorded sheet P to remain in the discharge path T2 or in the feed-in path T4 and the switch-back path T5.

Although the printer 10 according to the embodiment of the present disclosure basically has the configuration described above, it goes without saying that the configuration may be partly modified or omitted without departing from the gist of the disclosure of the present application.

In the printer 10, the lock lever 102 may be without the rotation central axis C2 and configured to slide linearly.

The anterior surface 112 is not limited to a planar surface and may be a curved surface. It is also possible not to form a slanted surface like the anterior surface 112.

The engagement surface 108 is not limited to a planar surface and may be a curved surface.

The rotation central axis C2 may intersect with the rotation axis C1 instead of being orthogonal thereto.

The position of contact G between the engagement surface 108 and the counter-engagement shaft 55 in the closed state may be located at the same position as the rotation central axis C2 or higher than the rotation central axis C2 in the Z-direction.

The lock lever 102 may be provided at the apparatus main body 12, and the counter-engagement shaft 55 may be provided at the inner door unit 60.

In the printer 10, the engagement surface 108 in the second posture may extend to one side of the position of contact G with the counter-engagement shaft 55 when seen in the axial direction of the rotation central axis C2.

The angle θ1 formed between the Z-direction and the A-direction may be 45° or greater.

The outer door unit 30 may be configured not to be pressed against the inner door unit 60.

The pinch rollers 94 and the press springs 96 may be provided at the outer door unit 30, and the rubber rollers 36 may be provided at the inner door unit 60.

No transport path for a sheet P has to be formed between the inner door unit 60 and the outer door unit 30.

The printer 10 may be without the line head 28 so as to be configured simply as a medium transport apparatus that transports a sheet P.

The plurality of rotating bodies may be such that one of them is provided at the apparatus main body 12, and one of them is of them are provided at the inner door unit 60.

The inner door unit 60 is not limited to being configured such that the rotation axis C1 extends vertically, and may be configured such that the rotation axis C1 extends horizontally.

What is claimed is:

1. A medium transport apparatus comprising:

an apparatus main body in which a medium is transported;

an outer door;

an inner door disposed inward of the outer door, the inner door being coupled to the apparatus main body and configured to rotate about a rotation axis and switch between an open state and a closed state;

a plurality of rotating bodies configured to be away from each other in the open state and to be in contact with each other and transmit a drive force in the closed state; and a lock mechanism section that locks the inner door against the apparatus main body to bring the inner door into the closed state and unlocks the inner door from the apparatus main body to bring the inner door into the open state, wherein the lock mechanism section includes a counter-engagement portion extending in a first direction, an engagement portion having an engagement surface configured to change in position between a first posture and a second posture in a second direction intersecting with the first direction and engage with the counter-engagement portion, and an application member that applies a force to the engagement portion to enable the engagement surface to change in position from the first posture to the second posture, in a closing operation of the inner door, the engagement surface changes in position from the first posture to the second posture while shifting a position of contact with the counter-engagement portion, in the closing operation and in the closed state, the engagement surface applies, to the counter-engagement portion, a pull-in force for moving the inner door to a closed position, and in the closing operation of the inner door the application member overlaps the counter-engagement portion and the engagement surface when viewed along a lock lever rotation axis that is orthogonal to the rotation axis of the inner door.

2. The medium transport apparatus according to claim 1, wherein the engagement portion has a central axis of rotation relative to the inner door.

3. The medium transport apparatus according to claim 2, wherein the engagement portion includes an anterior surface that comes into contact with the counter-engagement portion before the engagement surface does when a state of the inner door switches from the open state to the closed state, and when the anterior surface is in contact with the counter-engagement portion, the engagement portion receives, from the counter-engagement portion, a reactive force in a rotational direction in which the engagement surface is moved from the second posture to the first posture.

4. The medium transport apparatus according to claim 2, wherein in the closed state, the central axis of rotation is orthogonal to the rotation axis.

5. The medium transport apparatus according to claim 2, wherein in the closed state, the position of contact between the engagement surface and the counter-engagement portion is located lower than the central axis of rotation in an apparatus height direction.

6. The medium transport apparatus according to claim 2, wherein the engagement portion is provided at one of the apparatus main body and the inner door, the counter-engagement portion and a restriction portion that restricts movement of the inner door are provided at another of the apparatus main body and the inner door, and in the closed state, the counter-engagement portion is at a position overlapping with the restriction portion in an apparatus height direction.

7. The medium transport apparatus according to claim 2, wherein when seen in an axial direction of the central axis of rotation, the engagement surface in the second posture extends to both sides of the position of contact with the counter-engagement portion.

8. The medium transport apparatus according to claim 7, wherein the engagement surface is a slanted surface extending in an intersecting direction intersecting with an apparatus height direction, and an angle formed between the apparatus height direction and the intersecting direction is greater than 0° and smaller than 45°.

9. The medium transport apparatus according to claim 1, wherein the outer door is provided to the apparatus main body outward of the inner door, the outer door is rotatably coupled to the apparatus main body and is thereby configured to switch between an opening state and a closing state, and in the closing state, the outer door presses the inner door in the closed state against the apparatus main body.

10. The medium transport apparatus according to claim 9, wherein one of the inner door and the outer door is provided with a rotatable roller and an elastically deformable press member that presses the roller toward another of the inner door and the outer door, and the other of the inner door and the outer door has a contact portion that comes into contact with the roller.

11. The medium transport apparatus according to claim 10, wherein a first transport path along which the medium is transported is formed between the apparatus main body and the inner door, and a second transport path along which the medium is transported by rotation of the roller is formed between the inner door and the outer door.

12. The medium transport apparatus according to claim 11, further comprising a recording section that performs recording on the medium transported thereto.

13. A medium transport apparatus comprising:

an apparatus main body in which a medium is transported;

a door coupled to the apparatus main body and configured to rotate about a rotation axis and switch between an open state and a closed state;

a plurality of rotating bodies configured to be away from each other in the open state and to be in contact with each other and transmit a drive force in the closed state; and a lock mechanism section that locks the door against the apparatus main body to bring the door into the closed state and unlocks the door from the apparatus main body to bring the door into the open state, wherein the lock mechanism section includes a counter-engagement portion extending in a first direction, an engagement portion having an engagement surface configured to change in position between a first posture and a second posture in a second direction intersecting with the first direction and engage with the counter-engagement portion, and an application member that applies a force to the engagement portion to enable the engagement surface to change in position from the first posture to the second posture, in a closing operation of the door, the engagement surface changes in position from the first posture to the second posture while shifting a position of contact with the counter-engagement portion, and in the closing operation and in the closed state, the engagement surface applies, to the counter-engagement portion, a pull-in force for moving the door to a closed position, the engagement portion has a central axis of rotation relative to the door, the central axis of rotation and the counter-engagement portion overlap in the closed state, when seen in the second direction.

14. The medium transport apparatus according to claim 13, wherein the engagement portion includes an anterior surface that comes into contact with the counter-engagement portion before the engagement surface does when a state of the door switches from the open state to the closed state, and when the anterior surface is in contact with the counter-engagement portion, the engagement portion receives, from the counter-engagement portion, a reactive force in a rotational direction in which the engagement surface is moved from the second posture to the first posture.

15. The medium transport apparatus according to claim 13, wherein in the closed state, the central axis of rotation is orthogonal to the rotation axis.

16. The medium transport apparatus according to claim 13, wherein in the closed state, the position of contact between the engagement surface and the counter-engagement portion is located lower than the central axis of rotation in an apparatus height direction.

17. The medium transport apparatus according to claim 13, wherein the engagement portion is provided at one of the apparatus main body and the door, the counter-engagement portion and a restriction portion that restricts movement of the door are provided at another of the apparatus main body and the door, and in the closed state, the counter-engagement portion is at a position overlapping with the restriction portion in an apparatus height direction.

18. The medium transport apparatus according to claim 13, wherein when seen in an axial direction of the central axis of rotation, the engagement surface in the second posture extends to both sides of the position of contact with the counter-engagement portion.

19. The medium transport apparatus according to claim 13, further comprising a recording section that performs recording on the medium transported thereto.

20. A medium transport apparatus comprising:

an apparatus main body in which a medium is transported;

an outer door;

an inner door disposed inward of the outer door, the inner door being coupled to the apparatus main body and configured to rotate about a rotation axis and switch between an open state and a closed state;

a plurality of rotating bodies configured to be away from each other in the open state and to be in meshing contact with each other and transmit a drive force in the closed state; and a lock mechanism section that locks the inner door against the apparatus main body to bring the inner door into the closed state and unlocks the inner door from the apparatus main body to bring the inner door into the open state, wherein the lock mechanism section includes a counter-engagement portion extending in a first direction, an engagement portion having an engagement surface configured to change in position between a first posture and a second posture in a second direction intersecting with the first direction and engage with the counter-engagement portion, the engagement portion further comprises a front wall portion restricting clockwise rotation of the engagement portion and a rear wall portion restricting counter-clockwise rotation of the engagement portion, the apparatus main body having an abutting portion configured to abut on the front wall portion and the rear wall portion, and an application member that applies a force to the engagement portion to enable the engagement surface to change in position from the first posture to the second posture, in a closing operation of the inner door, the engagement surface changes in position from the first posture to the second posture while shifting a position of contact with the counter-engagement portion, and in the closing operation and in the closed state, the engagement surface applies, to the counter-engagement portion, a pull-in force for moving the inner door to a closed position.

* * * * *